Oct. 22, 1946.  C. E. FITCH  2,409,619
LEVER GUN
Original Filed Oct. 19, 1942
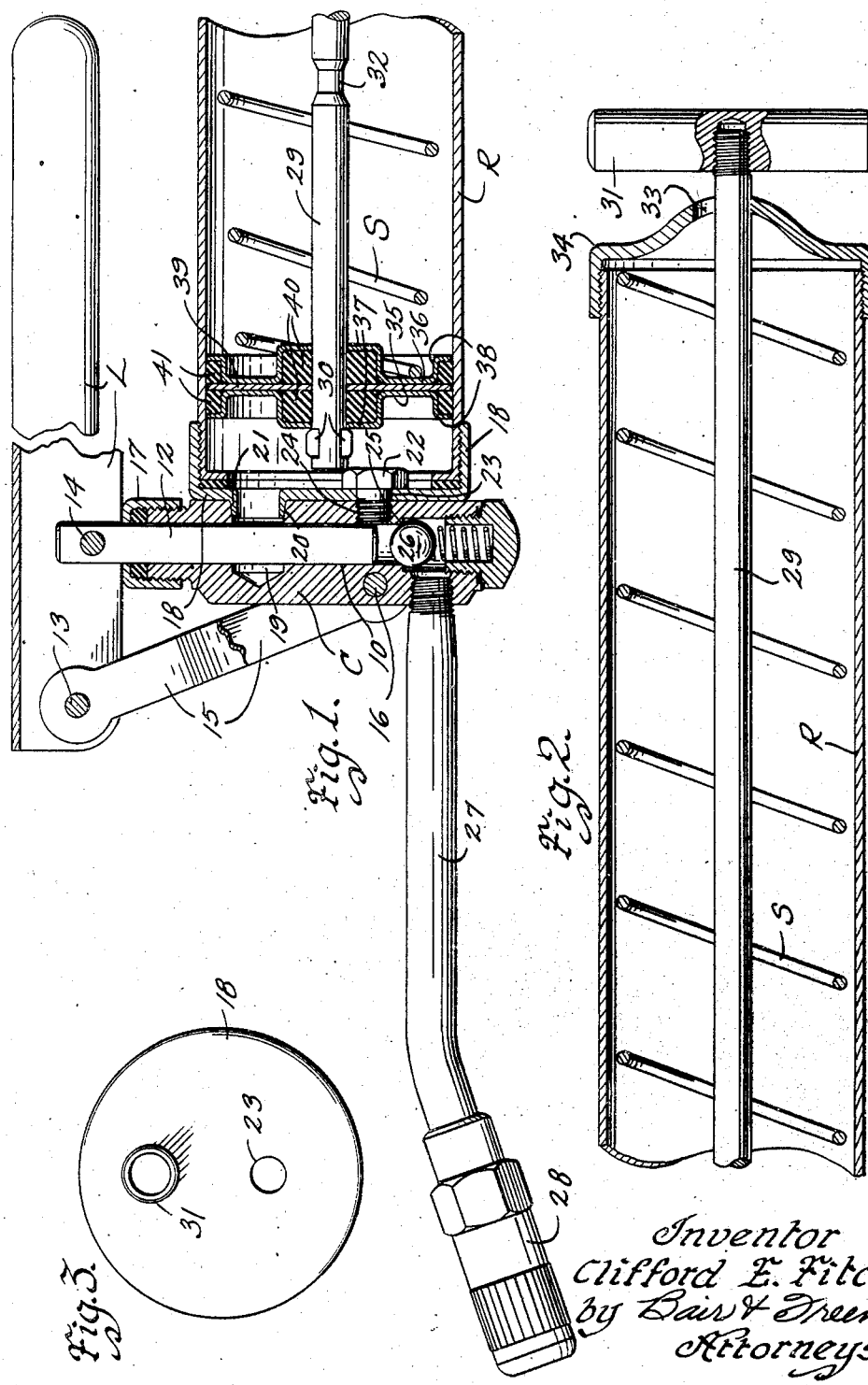
Inventor
Clifford E. Fitch
by Bair & Freeman
Attorneys Patented Oct. 22, 1946

2,409,619

UNITED STATES PATENT OFFICE 2,409,619

LEVER GUN

Clifford E. Fitch, Bryan, Ohio, assignor to The Aro Equipment Corporation, Bryan, Ohio, a corporation of Ohio Original application October 19, 1942, Serial No. 462,597. Divided and this application September 21, 1943, Serial No. 503,191

4 Claims. (Cl. 222—256)

My present invention relates to a lever type grease gun or a gun for handling similar substances and expelling the substances by high pressure imparted thereto by the operation of the lever of the gun.

This application is a division of my co-pending application Serial No. 462,597, filed October 19, 1942.

One object of the invention is to provide a novel form of follower in the reservoir cylinder of a grease gun which may be inexpensively formed of sheet metal parts, such as a flat washer like element and a pair of formed cup washers similar to each other and associated with the flat washer to provide packing washer grooves.

A further object is to provide therewith in such a manner as to eliminate the necessity of screwed connections or other expensive structures.

With these and other objects in view, my invention consists in the construction, operation and combination of the various parts of my apparatus, whereby the objects contemplated are attained, as hereinafter more fully set forth, pointed out in my claims and illustrated in the accompanying drawing, in which:

Figure 1 is a sectional view through the front portion of a lever type grease gun embodying my invention;

Figure 2 is a similar sectional view through the rear portion thereof, Figure 2 being a continuation of Figure 1; and Figure 3 is a front elevation of a reservoir head used in my grease gun.

On the accompanying drawing I have used the reference character C to indicate a high pressure cylinder and R a reservoir cylinder. The cylinder C has a bore 10 in which a plunger 12 is reciprocable. The plunger 12 may be reciprocated by a lever L carrying pivot pins 13 and 14. The pivot pin 13 is connected by a pair of links 15 with a pivot pin 16 which, in turn, is carried by the cylinder C. The pivot pin 14 extends through flanges of a channel-shaped portion of the lever L. A packing gland 17 is provided on the cylinder C for preventing leakage around the plunger 12 at its point of entry into the cylinder C. The reservoir R is screwed into a reservoir head 18 which, in turn, is secured to the cylinder C in a novel manner, which will now be described.

The cylinder C has an induction opening 19 provided with a tapered portion 20. The reservoir head 18 has a similarly tapered discharge spout 21 which is a press-fit in the taper 20. The head 18 is then secured in position by a single cap screw 22 extending through an opening 23 of the head 18 and threaded into an opening 24 of the cylinder C. Thus the cylinder and reservoir are retained assembled with relation to each other by means of a single cap screw 22 which may be of the ordinary kind as distinguished from a special cap screw, as used in some guns, having a hole bored through it. At the same time, a grease-tight joint is made against the taper 20 of the induction opening 19 which will withstand the relatively low grease pressure to which this joint is subjected. Such pressure results due to a follower spring S acting upon a follower piston P.

The cylinder C has the usual check valve seat 25 against which a check ball 26 is spring-seated, and is provided with the usual discharge pipe 27 ending in a discharge nozzle 28 for connection with a lubricant reception fitting or the like. These details form no part of my present invention.

The piston P is adapted to be retracted against the action of the spring S by a rod 29. The rod 29 has projections 30 at its forward end to engage the piston for retracting purposes. A handle 31 is provided on the rod exterior of the reservoir R, and may be used for withdrawing the piston into the reservoir after the reservoir has been unscrewed from the head 18 and thrust into a container of grease for recharging the reservoir. After the rod 29 is pulled out nearly to its limit, a groove 32 in the rod 29 may be made to coact with the narrow part of a keyhole slot 33 in a second reservoir head 34. This retains the piston in its retracted position while the reservoir is screwed back in position with respect to the reservoir head 18. The groove 32 may then be disengaged from the narrow part of the keyhole slot 33 and the rod 29 pushed forwardly to the position shown on the drawing, leaving the piston P in its retracted position with the spring S fully compressed. Thereafter, operation of the lever L will eject grease at high pressure from the nozzle 28, and the piston P will progressively advance under the action of the spring S, charging the bore 10 with grease each time the piston plunger 12 is raised to a point where its lower end is within the induction opening 19.

Heretofore, follower pistons have been made of castings, and machined. I have provided a piston P of special construction, which is very inexpensive to manufacture. It consists of a pair of disks 35 and 36 each having a cup-like center portion 37 and offset flanges 38 adjacent its periphery. A third disk 39, which is substantially flat, may be interposed between the two disks 35, and all three of them secured together, as by spot-welding or riveting. Before assembly, however, a pair of packing washers 40 are placed in the cup-like center portions 37 of the disk 35, and these are preferably of such size that when the disks are spot-welded or riveted together, the washers are compressed to bear against the rod 29 with sufficient force to prevent leakage of grease past the rod under the action of the spring S.

The offset peripheral flanges 38, together with the peripheral marginal edge of the disk 39, provide a pair of grooves into which packing rings 41 may be inserted after the disks are assembled. The packing washers 40 and the packing rings 41 may be formed of suitable rubber-like material, not attacked by grease, and, together with the disks, form a relatively inexpensive yet leak-proof piston.

Having described my invention, it is obvious that I have made provision for reducing the cost of a lever type gun for grease or the like by inexpensively formed parts requiring a minimum of assembling operations. Certain changes, of course, may be made in the details of my invention without departing from the real spirit and purpose of my invention, and it is my intention to cover by my claims any modified forms of construction or use of mechanical equivalents, which may be reasonably included within their scope.

I claim as my invention:

1. A grease gun follower comprising a pair of sheet metal disks, said disks having opposed cup-like center portions, packing washers received and compressed therein for sealing said follower relative to a piston rod, said disks having opposite offset peripheral flanges, packing rings received therein, a flat disk between said pair of disks, said packing washers and packing rings being split on opposite sides of said flat disk and adjacent rings and washers thereby isolated from each other.

2. A grease gun follower comprising a pair of disks having opposed cup-like center portions, and packing washers received and compressed therein by the opposed cups for sealing said follower relative to a rod.

3. In a grease gun, a reservoir cylinder, a follower in said cylinder comprising a pair of sheet metal disks having opposed offset peripheral flanges around their marginal edges, packing rings received in said flanges only, and a flat disk between said packing rings, said flat disc contacting with said pair of discs inwardly of said marginal edges and separating said rings from each other.

4. A follower comprising a pair of sheet metal disks having opposed cup-like center portions and opposite offset peripheral flanges, a flat disk between said pair of disks, a packing ring in each of said cup-like center portions, and a packing washer in each of said offset peripheral flanges, said flat disk isolating said rings and washers from each other.

CLIFFORD E. FITCH.